United States Patent [19]

Dunn

[11] 3,735,094

[45] May 22, 1973

[54] OPTICAL CODE READING SYSTEM

[75] Inventor: Robert A. Dunn, Willowick, Ohio

[73] Assignee: Addressograph-Multigraph Corporation, Cleveland, Ohio

[22] Filed: July 3, 1972

[21] Appl. No.: 268,409

Related U.S. Application Data

[63] Continuation of Ser. No. 50,129, June 26, 1970, abandoned.

[52] U.S. Cl. ..........235/61.11 E, 250/219 D, 356/71, 250/239

[51] Int. Cl. .......G06k 7/015, G06k 7/10, G06k 9/04

[58] Field of Search.................235/61.11 E, 61.11 R; 250/219 D, 219 DC, 227, 239, 219 DQ, 219 CR, 219 R; 356/71; 340/146.3 F

[56] References Cited

UNITED STATES PATENTS

| | | | |
|---|---|---|---|
| 3,538,499 | 11/1970 | Rabinow et al. | ...............340/146.3 F |
| 3,432,676 | 3/1969 | Lindberg | .............................250/239 |

OTHER PUBLICATIONS

Underwood, "Card Reader Clocking System," IBM Technical Disclosure Bulletin, Vol. 7; No. 12, May 1967, p. 1750

*Primary Examiner*—Maynard R. Wilbur
*Assistant Examiner*—Thomas J. Sloyan
*Attorney*—Russell L. Root

[57] ABSTRACT

An optical scan card reader incorporating substantially a dual electrical package as set forth in U.S. Ser. No. 11,613, filed Feb. 29, 1960. Although that teaching is not essential to an understanding of this description, it is referred to for the convenience of those who may not be fully familiar with such electronic systems.

This invention sets forth the coordination of a plurality of optical scan devices having a plurality of read heads aimed at a single strip area extending transverse to the path of travel of a document whereby various portions of a single document may be read simultaneously by the read head as those portions are positioned in the strip area. The invention further sets forth means to find and read a scan path wherever it is located on a document and a plurality of interchangeable light responsive means arranged in different predetermined arrays which may be selectively inserted in the read head to sense varying arrays of data carried on the document.

7 Claims, 7 Drawing Figures

ROBERT A. DUNN
INVENTOR
BY Ray S Pyle
ATTORNEY

ROBERT A. DUNN
INVENTOR
BY Roy S. Pyle
ATTORNEY

OPTICAL CODE READING SYSTEM

This is a continuation, of application, Ser. No. 50,129 filed June 26, 1970 and now abandoned.

BACKGROUND OF THE INVENTION

The storing of information on cards for later mechanical or electrical "reading" is becoming an essential part of business existence. Macker et al. U.S. Pat. No. 3,229,073 is an example. Usually the cards are original source data cards, and the reading is done for the purpose of transforming the information into computer input form.

As data gathering becomes more a part of the general business plan, more than one type and location of data is necessary to be entered upon and read from a card.

A hospital is an example of a user of such data devices, and throughout this specification an actual hospital data gathering situation is used as the illustration of the advantages of this invention.

SUMMARY OF THE INVENTION

An advantage of this invention is found in the simultaneous reading of multiple scan paths on a data document with a single document drive system. It is an object of this invention to provide the mechanically practical equipment to make the available electronic technology reliable.

Therefore, the advantage of this invention is in the provision of a plurality of optical sensing devices which are each capable of focusing an image of at least a portion of a strip area onto separate image planes, with light responsive devices for responding to light and shadow patterns, the devices positionable to respond to desired portions of the strip area. The object of the invention is to permit operator selection of two or more code paths on a document to be read and to move the correct light responsive device into focus with that code path regardless of lateral location of the code path on the document.

An advantage of the invention is that a movable optical read head, capable of adjustment laterally of a tab card path for finding and reading a selected scan path, is precisely positionable by projecting a narrow beam of light from within the head in a reverse direction of the normal scan, the projected beam is used to locate the view which the head will scan.

Another advantage, or object, is that a read head may be armed for reaction to any desired array of light and shadow by removal of one reaction target within the head and the insertion of another.

IN THE DRAWINGS

DEFINITIONS

Figure 1:
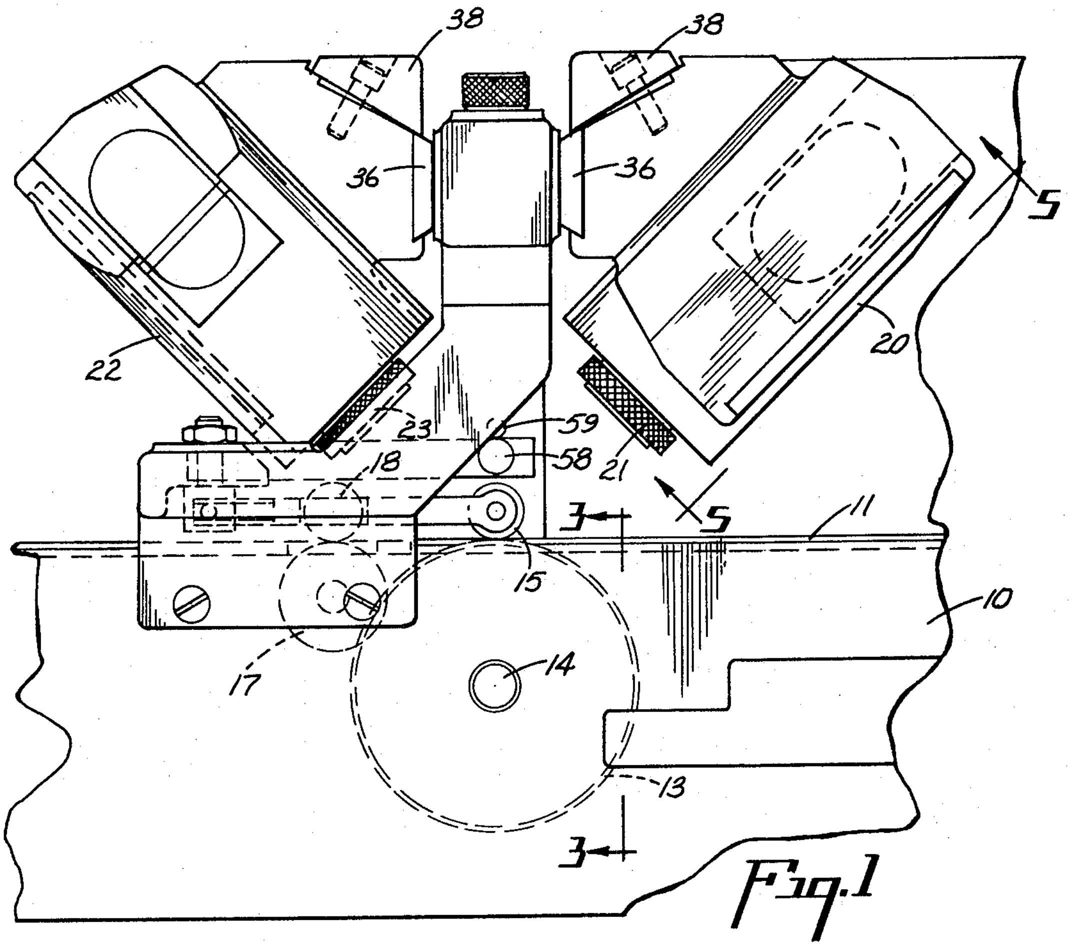
FIG. 1 is a front elevation of a portion of a complete machine, wherein the optics and timing control of this invention are located.

The term "tab card" is not found in dictionaries of general circulation, but is a term widely used to refer to thin cardboard cards approximately 7¼ x 3¼ and with one corner cut away to provide an identification notch. The term is derived from the concept of tabulating information, and the dictionary does use the term in describing a tabulating machine. See Webster's Third New International Dictionary (Unabridged), published in 1966 by C & C Merriam Company.

"Scan path" is a term normally employed for that portion of a path of travel traversed by a tab card during the transfer of information from the card to a reading device for transportation into electrical signals.

"Read head" is a term employed to describe that device which senses information on a tab card, whether that sensing is done optically, megnetically, or mechanically.

"Scan head" as used herein, refers to a complex of read heads and devices.

"Strip area" is an arbitrary term employed to describe a special feature of this invention. Whenever a lens views a series along a scan path, it is very hazardous to subject the card to more than one drive system during the scan. Absolute precision is very costly, if in fact obtainable. Buckle or jerking will occur whenever the two systems are not perfectly matched.

Accordingly, two read heads may be focused to two separate areas in tandem, but the material to be read must be within a margin equal to the separation of the read lines. One line is preferred, but some separation is acceptable. About one-fourth inch from the edge is as close as the code to be read would normally be placed.

Therefore, because a line by definition has no width, throughout this specification a "strip area" will be considered as the "line" to which each read head is focused. This "strip area" is defined by two imaginary parallel lines which extend transverse to the scan path and between which the code is positioned as it is read by the read heads.

The illustrated apparatus incorporates three definite novel advantages. First, two read heads are mounted to read on a common strip area extending across the path of document travel. Thus, regardless of where one may decide to place data on the document, one or both read heads can find and read the data.

The second advantage is in a novel aiming means, incorporating an internal light source which is beamed in a reversal of a reading light path.

Finally, each head is armed by a removable closure door which carries a set of light responsive devices positioned to correspond to a particular array of light and shadow. A head is altered by removing one closure door and placing another in the opening. This change may take place in moments of time by a nonskilled operator.

There are many machines and devices available for taking tab cards from a stack, transporting those cards to a read station of a code reader, and then transporting the cards through other operations including restacking. Accordingly, a complete machine is not illustrated in the drawings, because such machines are old and well known. The base structure machine upon which the illustrated embodiment of the present invention was built, is such a machine purchased in the marketplace and generally available for tab card handling.

The machine of standard construction is that portion indicated generally by the reference character 10 and is indicated as the machine base. It has a table surface bed 11 along which tab cards are transported.

Although not necessarily standard to the machine illustrated, the tab cards are transported through a conventional type of drive indicated by large wheels 13 which have a soft rubber surface coating, mounted upon and driven by shaft 14. A set of idler wheels 15, one of which is visible in FIG. 1, act as weighted wheels to hold a card tight against the surface of the drive wheels 13 for transport through the read station. Wheels 13 are spaced approximately the width of the card to be transported and the idler wheels 15 are held on a wishbone construction to match the position of the drive wheels 13. Secondary roller 17 with an idler ball 18 is provided to simply hold the card flat to the bed and prevent any tendency of the card to buckle or misguide through the area of the read station. Card movement as described is believed to be superior to scan head movement for obtaining relative transporting movement between a tab card on said bed and the scan head along a scan path.

The read heads of this invention which compose the scan head are indicated by the reference character 20 for one of the heads and that head carries a lens 21. A second head 22 has a lens 23. The illustration in this specification is limited to two read heads although it will be seen that it is feasible to have more. Heads 20 and and 22 represent independent optical systems on the scan head.

Figure 2:
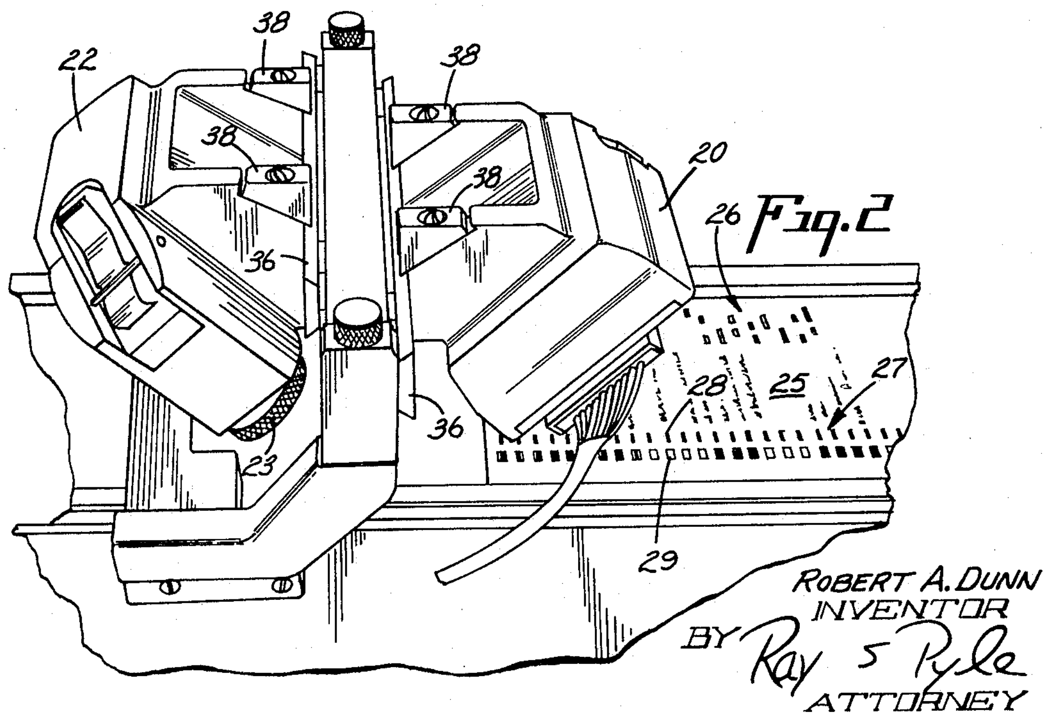
FIG. 2 is a perspective view of the area shown in FIG. 1.

A tab card 25 in FIG. 2, illustrates one of a multiplicity of tab card designs. This illustrated card is a hospital type of card wherein the patient information is set forth in bar code form shown in the bar code group 26 at the top of the card. The needs of the patient or the functions performed by the doctor or nurse, are then marked in the mark path group 27. Normally, such a card carries printed explanations of various medical analyses or services in column form, and a heavy black mark 28 is located at the end of the column in order to provide a control mark to be read by the read head indicating a position location. Thus, the read head may be caused to read only during the travel of the black printed mark 28, and not read between the marks, in order to reduce the possibility of stray scratches, dirt and interferences causing "noise" in the reading system. Then, a box 29 is available along side the mark 28 which may be filled in with a pencil or pen by the doctor or nurse and if there is a mark located there, the read head will sense that presence of a mark and indicate that the service or medical function has been provided.

HOwever, this is only one of the multiplicity of tab card possibilities, this one being selected as an actual example to show the presence of two separate scan paths which must be read, but which could be located at any lateral position across the card according to the dictates of the person designing the card. This invention will find and read those scan path codes of whatever location and whatever type.

It is desired that as the tab card 25 moves through the read station under the heads, that the read head focused to read the group 26 read only while there is code to be read. That is, it is desired that the read head be unable to transmit signals beyond a particular location. Thus, the card may be filled up with various information including ordinary alphanumeric markings or simple printing for visual reading and yet the isolated group of bar codes be read when they pass under the read head.

Figure 3:
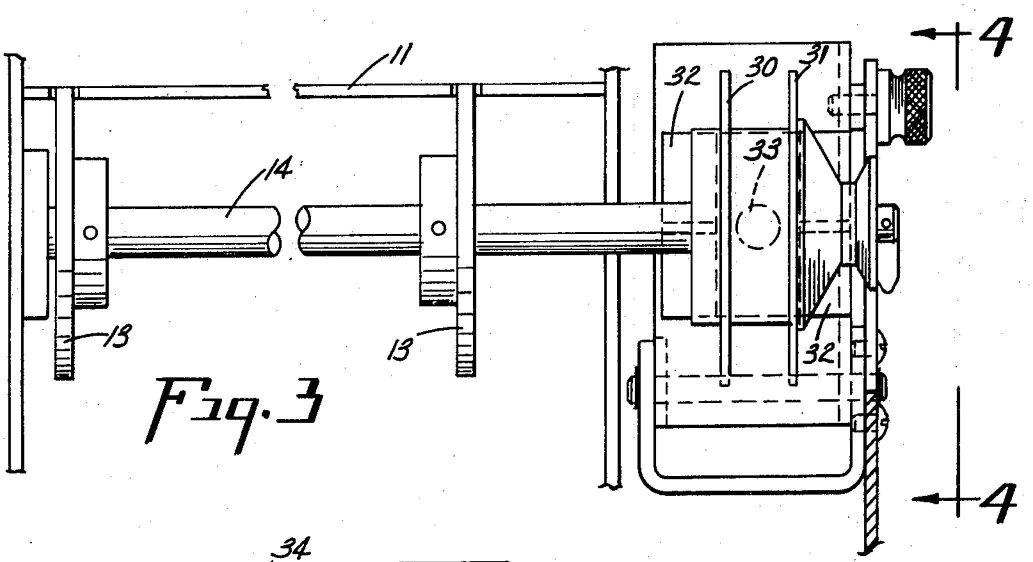
FIG. 3 is a side elevation of a control shaft and timing mechanism as viewed in FIG. 1 along the line 3—3.
Figure 4:
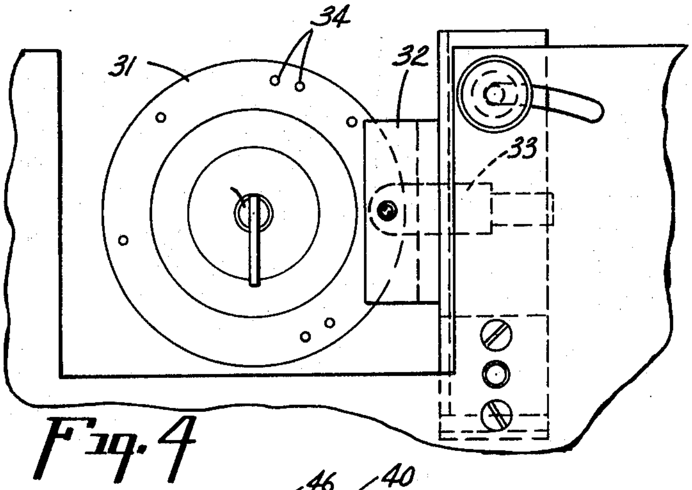
FIG. 4 is taken along line 4—4 of FIG. 3.

Therefore, use is made of timing discs 30 and 31 carried at the end of the shaft 14 as best shown in FIG. 3. A photocell is housed in each of two housings 32, only one of which is readily visible in the drawings and that is shown in FIG. 4. The housings 32 are on the rear side of the structure shown in FIG. 3. A light bulb 33 projects between the two disc members and light is emitted through holes 34 punched in the discs. A hand punch is employed to provide holes 34 where desired and as the discs turn to register a hole 34 with the light bulb 33, light will flash through the hole to the light sensitive photocell in the housing 32 and cause an electrical signal. That signal is employed through conventional electronic circuitry to cause a read head to become activated and begin transmitting signals corresponding to the bar code or other code being observed. Then, when another hole passes in registration between the bulb 33 and the photocell, the read head is caused to become inactive. In this manner, the read head looks only at that which is wanted, and ignores all other marks and printing.

The drive is cyclic. The wheel 13 makes one full revolution and stops. A card is brought to the bite of the drive wheel and idler, and then the cycle begins. The card is measured by the wheel 13 and the punched discs are synchronized with it in drive action.

In conventional manner, a tab card 25 is brought to a ready station and then fed into the bite between the wheel 13 and the idler wheel 15 to begin its travel through that area of the machine. Hence, the moment the wheel 13 begins to turn, the card will be advanced, and at the same instance the two timing discs 30 and 31 will begin to turn because they are on and driven by the same shaft. Hence, the drive and the timing mechanism are in synchronism. The holes in the discs 30 and 31 will provide sufficiently accurate signal location to cause the read heads to begin and cease operation in correct registration.

The function of timing by the discs 30 and 31 is to be differentiated from the timing which takes place in the mark path 27. In that path 27, as the read head observes the presence of a mark 28, it will be able to signal the electronic circuitry to accept a signal from the presence of a mark in a box 29, if there is a mark there. Then, as the mark 28 passes the observation of the lens of the read head, the read head becomes deactivated and regardless of whether marks appear between the two marks 28, no signal would be read and transmitted. Even in a column such as the path 27, the timing discs may be employed to cause the read head to view a certain number of the marks and disregard others, but that function differs from the rapid activation and deactivation for prevention of noise signals between actual marking areas.

It is believed preferable to supply an optical system of smaller field (and shift the lens) whenever focusing lenses are employed then to attempt to use a wide angle lens and shift the internal array of electronic sensors associated with each optical system.

The two read heads 20 and 22 are mounted by ways 36, in the position shown in FIG. 1, whereby the two heads are aimed at a single strip area extending transversely of the path of travel of the tab card 25. Because of the use of clamps 38, the heads can be shifted to read any place on that strip, from one end to the other, in order to find and transmit signals in correspondence with a path or group of code markings or holes anywhere on the card.

The illustrated embodiment is ideal for a two or four read head machine because of the ease of balance of the heads in opposed angular relationship and hence they will not interfere with one another. The heads are clamped in position by the clamps 38 after they have reached their desired location, and in some instances it is desirable to add a vernier adjustment for very fine movements of the head after a rough location has been selected and clamp 38 has been tightened.

Figure 5:
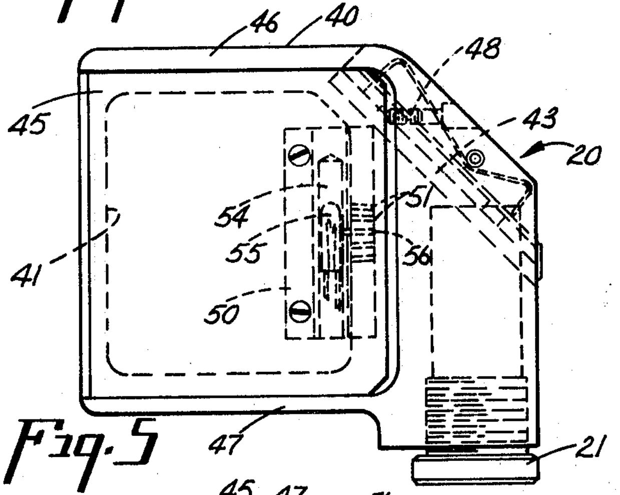
FIG. 5 is a plan view of one read head taken along line 5—5 of FIG. 1.
Figure 7:
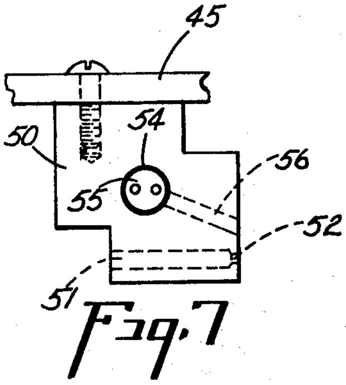
FIG. 7 is an enlarged end view of the photocell block seen in FIG. 6.

The illustrated read heads are built into structures embodied around casings 40 having an internal cavity 41. A corner mirror 43 is employed to reflect signals viewed by the lens, for example lens 21 shown in FIG. 5, and bring those visual marks to focus at an imaginary plane within the cavity 41.

A closure door 45 is employed to close the entrance opening to the cavity 41. Ridges 46 and 47 provide tracks so that the closure door will have a precise guide and means for locating the door laterally.

Figure 6:
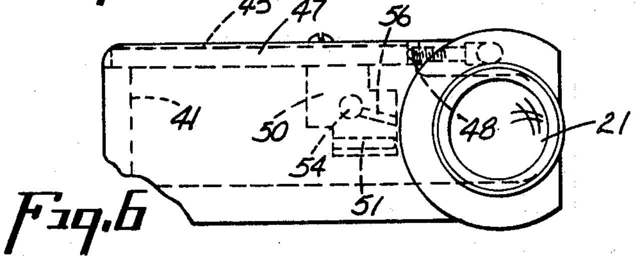
FIG. 6 is an end view of the read head of FIG. 5.

A block 50 is carried by the closure door and projects down into the cavity 41. Block 50 has a plurality of photocell cavities 51 in which the photosensitive devices are housed, and a very fine pinhole 52 (see FIG. 6) through the front of the block will admit the light to the particular photocell cavity, and thus prevent scatter rays from affecting adjacent photocells. The front face of the block 50 is brought forward as the closure door is inserted, until that face just arrives at the imaginary plane of focus produced by the lens and the mirror. Then, the presence or absence of light, caused by the presence or absence of marks or holes in the card 25 will be brought to precise registration on the face of the block 50. If there is a cavity 51 and pinhole 52 located at that position, then that light and shadow pattern will affect the system and be read as a signal.

In this manner, the read heads 20 and 22 are made universally available for any signal pattern. A plurality of the closure doors 45 are each equipped with a block 50 each drilled with photocell cavities 51 and pinholes 52 to correspond to a particular array of code markings or holes in the tab card to be read. Then, whenever a tab card with a different code is to be read by the machine, the closure door 45 currently in the head is simply lifted out and a new one corresponding to that new code is dropped in place. Then, only the shadow and light pattern of the new code will be effective upon the output of the machine.

In order to enable such alternate use of closure doors effectively, without the aid of a skilled technician, the doors are made precisely the width of the space between the ridges 46 and 47, and then a test structure is put into the opening to the cavity 41 and moved forward until registration with the focus plane is achieved as established by test equipment. Then, a screw 48 is run forward against a front edge of the closure door and sealed in place. Therefore, by making each closure door to rigid dimension standards, and locating each block 50 in a precise location upon each of the doors, the doors become exactly interchangeable without refocusing when a door is substituted.

The use of the signal output from the various substituted door members, is a matter of electronic developments, within the skill of an electronics engineer, and is not a part of the present invention.

Location of the read heads must be quite precise whenever a scan path is to be selected and read. The lens 21 and 23 will view a limited swath in order not to be affected by extrenous matter of no interest. In past procedures, elaborate steps have been necessary in order to allow the operator to view through the lens in order to locate the path to be read. According to this invention, a method is provided for setting the alignment of the scan path of a code mark on a document which comprises placing a test document in the form of tab card 25 in reading location in the track with a location reference mark which indicates a predetermined relationship to the correct location of the code marks to be read. That is, in the case of the bar code group 26, a mark is used representing the middle of the middle mark. Other means may be employed to locate the exact center of the swath to be read.

Then, a narrow beam of light is projected from a position upon the head against the document in a plane which intersects the document and is parallel to the direction of scanning travel of the document. In the illustrated embodiment a light bulb cavity 54 is drilled in the top of the block 50 and a bulb 55 is caused to reside therein. (See FIG. 6). Then, a hole 56 is drilled to the face of the block 50 and therefore when the bulb 55 is energized, a beam will be projected through the hole 56. The beam will be reflected by the mirror 43 and projected down through the lens 21 will impinge upon the line across the read station in an exact reversal of the path which light travels in reaching the face of the block 50. The hole 56 must bear a known relationship to the scan path defined by the reading element in order to intersect documents in an illumination spot indicative of the effective relationship of the reading element and the code mark. It is better practice to place the hole 56 in the exact center of the array of photocell cavity 51 but that is not a requirement. The hole could be to the side of the group and then the illuminated spot would be placed at the side of the group to be read. It is preferred to place the spot in the center and then place the illuminated spot in the center of the path to be read. By loosening the clamps 38 and, adjusting the read head transversely of the direction of the scan path, then the illuminated spot can assume the predetermined relationship to the reference mark and thereby indicate coincidence of the reading area with the path to be scanned.

An advantage of this invention is obtained by eliminating excess numbers of illuminating bulb and lenses for illuminating the marks, by placing the read head to one side of the scan path and then causing each lens to read exactly on the one lateral line or strip area. In order to illuminate that line, as shown in FIG. 1, illuminating means in the form of a rod lens 58 extends across the path which brings to focus the energy from a bulb 59 directly upon the strip area, which is preferably located directly superposed with the center line of the shaft 14. One bulb fully across the path is preferred, although illumination of a greater, or localized, field of the area is feasible.

What is claimed is:

1. In a data sensing machine having a machine bed and a scan head with drive means for providing relative transporting movement of a tab card on said bed and said scan head along a path, said drive means operable through a fixed cycle; the tab card having at least one row of indicia arranged transverse to said scan path and illuminating means for projecting radiant energy onto a field of said path having a predetermined relationship to said scan head;

the improvement comprising:

at least two independent optical systems on the scan head orientated to respond to light and shadow patterns on the same single strip area extending transverse to said path in said field with the strip area being defined by the same two parallel lines which contain a single row of indicia therebetween;

an array of electronic sensors associated with each optical system for reading information in said strip area; and means shiftably mounting at least one of said arrays on the read head for adjustment entirely across the scan path parallel to the strip area independently of and free of conflicting engagement with the other arrays;

whereby the data sensing machine may be set to interpret simultaneously plural sets of coded information represented by the row of indicia positioned within said single strip area, with the location of said one array being optionally positionable at any location transversely of the scan path.

2. A machine as defined in claim 1, in which the scan head is stationary and the drive means causes tab cards to be transported over the bed, whereby the field of illumination extends across the path traversed by said card.

3. A machine as defined in claim 1, in which said scan head comprises two separate read heads mounted on ways above said scan path, and directed in opposite directions to include said single strip area across said path, each of which is shiftable on said ways at least to the extent that the entire strip is available to one or both heads.

4. An optical code reader comprising:

a machine bed with drive means for transporting a tab card along a scan path;

illuminating means for projecting radiant energy onto a field of the path traversed by said card;

at least two read head optical systems focused to the same single strip area defined by the same two parallel lines which extend across said path in said field and which contain a single row of indicia therebetween with each of said read heads being adapted to read simultaneously indicia on the tab card arranged in a row extending traverse to said path, means for mounting said two heads to each read at substantially any position along said strip area;

a drive shaft extending across said path;

said drive means driven by said shaft;

a timing disc for each read head, said discs being driven by said shaft in synchronism with said drive means whereby each said disc is in a given rotary position as a row of indicia on the tab card is moved into position between the two parallel lines defining the single strip area; and timing means carried by said discs for activating or deactivating a corresponding read head according to a program thereon.

5. In a data sensing machine having a machine bed with a document guide defining a document path;

a document drive member having a peripheral surface which is mounted to intersect said guide path, means to move a known surface length of said member past a given line across said path in one cycle of operation;

means to hold a document in driven contact with said drive member surface for movement of a document length equal to said surface length; and timing means synchronized with said document drive member and operable through a fixed cycle corresponding to said known surface length;

the improvement comprising:

two read head optical systems focused to a strip area embracing said line across said path with each of said read heads being adapted to read simultaneously indicia in a row extending transverse to said path with each and every one of said indicia in the row being positionable between the same two parallel lines which extend transverse to said path, and which contain a single row of indicia therebetween, track means for mounting said heads a fixed distance from said document path with each of said heads being movable to scan a plurality of positions across said line with all positions of the path scannable by one or more heads; and said timing means controlling the read heads to cause the read heads to transmit simultaneously signals corresponding to the indicia on selected portions of a document passing said line.

6. An optical read head for sensing varying patterns of data comprising:

a casing;

a lens window for bringing an object plane to focus on an image plane in the space within said casing;

an opening through said casing in the vicinity of said image plane;

a plurality of prestructured individual closure members for said opening with each of said individual closure members being separately insertable in said opening;

light responsive means carried by each individual closure member, and means to shield said light responsive means of each closure member from all but directly focused rays;

said light responsive means on each of said closure members being arranged in a predetermined array;

said plurality of closure members being interchangeably receivable in said opening with said light responsive means of each closure member dimensioned to project into said space with the shield thereof positioned in alignment with said image plane;

whereby, the read head may be selectively conditioned to respond to varying arrays of data on the documents by inserting into the opening of the casing a closure member carrying light responsive means corresponding to the array of data to be read.

7. The data sensing machine of claim 1 wherein said scan head includes a source of illumination positioned at a predetermined position relative to said array of electronic sensors, and means for projecting illumination from said source out of said scan head on to said strip area in a reverse direction along the path followed by light in reaching said electronic sensors.

* * * * *